United States Patent [19]

Staub

[11] Patent Number: 5,601,396
[45] Date of Patent: Feb. 11, 1997

[54] METHOD AND DEVICE FOR MANIPULATING STACKED FLAT ARTICLES

[75] Inventor: Samuel Staub, Oberdürnten, Switzerland

[73] Assignee: Ferag AG, Hinwil, Switzerland

[21] Appl. No.: 521,811

[22] Filed: Aug. 31, 1995

[30] Foreign Application Priority Data

Oct. 10, 1994 [CH] Switzerland .................. 03041/94

[51] Int. Cl.$^6$ .............. B65G 69/00; B65B 5/00
[52] U.S. Cl. .............. 414/786; 414/416; 53/247; 294/99.1
[58] Field of Search ............... 414/416, 741, 414/751; 294/119.1, 86.41, 99.1, 902; 53/492, 247, 381.4

[56] References Cited

U.S. PATENT DOCUMENTS

| | | | |
|---|---|---|---|
| 4,178,119 | 12/1979 | Busch | 294/119.1 |
| 4,568,234 | 2/1986 | Lee et al. | 414/416 |
| 4,707,013 | 11/1987 | Vranish et al. | 294/119.1 |
| 4,938,655 | 7/1990 | Asano | 414/416 |
| 5,374,153 | 12/1994 | Nishi | 414/416 |
| 5,391,050 | 2/1995 | Gatteschi | 294/119.1 |
| 5,393,181 | 2/1995 | Perego | 414/797.9 |

FOREIGN PATENT DOCUMENTS

| | | |
|---|---|---|
| 0327858 | 8/1989 | European Pat. Off. |
| 0377399 | 7/1990 | European Pat. Off. |
| 0421148 | 4/1991 | European Pat. Off. |

Primary Examiner—David A. Bucci
Assistant Examiner—Douglas Hess
Attorney, Agent, or Firm—Spencer & Frank

[57] ABSTRACT

A method and a device for manipulating substantially similar flat articles each having two main surfaces and at least one pair of opposite edge portions delimiting the main surfaces, the flat articles being arranged in a stack such that consecutive ones of their main surfaces contact one another, outermost ones of the flat articles thereby forming two faces of the stack and consecutive superimposed edge portions of the flat articles thereby forming opposite edge surfaces of the stack. The method involves: providing a first stabilizing device and a second stabilizing device, each of the stabilizing devices being effective for stabilizing the stack in a freely selectable spatial orientation whereby at least two opposite portions of the opposite edge surfaces are accessible when the stack is being stabilized in either of the stabilizing means; providing a pair of clamping jaws having substantially flat and elastically deformable clamping surfaces facing each other and having a length greater than a distance between the two faces of the stack; positioning the clamping surfaces parallel to the at least two opposite portions when the stack is being stabilized by the first stabilizing device; moving the clamping jaws toward each other into contact with the at least two opposite portions after the step of positioning thereby clamping the stack between the clamping jaws whereby the clamping surfaces are deformed; moving the clamping jaws together with the stack to the second stabilizing device; and releasing the stack by moving the clamping jaws away from each other.

12 Claims, 3 Drawing Sheets

METHOD AND DEVICE FOR MANIPULATING STACKED FLAT ARTICLES

FIELD OF THE INVENTION

The invention concerns a method for manipulating stacked flat articles, and it concerns a device for carrying out the method.

BACKGROUND OF THE INVENTION

For arranging a plurality of similar flat articles it is obvious to form a stack such that the main surfaces of the flat articles lie against one another and that their edges are mostly parallel. Such a stack forms a body with two faces (main surfaces of the two outermost articles) and, if the articles are rectangular or square, four edge-surfaces (formed by the edges of the articles). The stability of such stacks and thus their manipulability is very restricted. They are only stable and manipulable as long as they lie on a horizontal support with the main surfaces of the articles substantially arranged horizontally, and as long as the height of the stack (distance between the faces of the stack, which is determined by the number and thickness of the stacked articles) does not exceed a maximal value determined by different properties of the articles.

Stacks with a height that exceeds the maximal height and/or stacks in with the main surfaces of the articles are not horizontal are only stable if corresponding means for stabilizing and/or guiding the stacks are employed. For stationary stacks or for stacks to be moved basically without changing their position in space, these stabilizing means are simple guiding means by which the stack, depending on its position, is held and supported on two or more sides. These guiding means can be formed such that the stacked articles are accessible from any side and such that the stacked articles are e.g. separately removable from the stack. Stabilizing means which serve for manipulating stacks, i.e. substantially seize stacks from guiding means, bring them into various different positions in space and deposit them in further guiding means, must meet far higher demands.

Means serving for stabilizing stationary stacks as well as for stabilizing them when moved and manipulated are e.g. binding means or containers which can be seized, manipulated and deposited by a suitable manipulating tool. Pairs of clamping jaws or plates are also used for seizing stacks by their faces. Such pairs of clamping plates can also be parts of manipulating tools.

All means described above for making stacks of flat articles stable and manipulable show disadvantages. Tied up stacks are very stable and can be manipulated at random and in all positions. Furthermore the binding means can easily be adapted to any format of articles. The maximum height however of tied up stacks is restricted. Especially for short manipulating steps, the tying up and untying is too much of an expenditure. Containers which contain flat articles can only be brought into random positions in space if they are closed and if their size is adapted to the stack precisely, i.e. if they are completely filled. Only partly filled containers are very restricted as what regards the positions in space they can be brought into without upsetting the original arrangement of the stack contained in the container. This is especially the case with open containers, which are used when the articles must be accessible also. Stacks which are held together with face-plates (clamping plates positioned on the two faces of a stack) can be brought into all positions in space without further means. The face-plates can however only be positioned and removed if the participating guiding means (stabilizing the stationary stack to be sized) do not interfere with the faces of the stack such that these are freely accessible. Furthermore the maximum height of a stack clamped between face-plates is rather small, especially for stacks of articles who's main surfaces are not exactly parallel and/or articles which are moveable against each other with low friction.

The object of the invention is to present a method with which a plurality of flat articles, which are held in a stacked order by stabilizing means, can be seized, brought into various positions in space and deposited in the area of further stabilizing means without upsetting the stacked order of the articles. The method, compared to known methods, is to show improvement on the one hand in that the stabilizing means on the seizing side and on the depositing side are submitted to as few conditions as possible and on the other hand in that the height of stack is variable within as large a range as possible and that very different articles, especially articles of small stiffness and very thin articles as well as articles with irregular thickness and/or with surfaces that are not suitable for stacking, can be manipulated in a stacked order without especially adapting the method. A further object of the invention is to create a device for carrying out the method according to the invention which device is easily adaptable to different formats of flat articles.

SUMMARY OF THE INVENTION

These objects are achieved by the method and the device according to the invention.

The method according to the invention consists substantially in holding a stack of flat articles between two clamping jaws which clamping jaws clamp two opposite edge surfaces of the stack or in particular two opposite part-areas of such edge surfaces which part-areas run over the whole height of the stack. The clamping surfaces of the clamping jaws are therefore elastically deformable e.g. by having a corresponding coating, such that the edges of the stacked articles are slightly impressed therein. These clamping surfaces extend beyond the faces of the stacks such that especially the outermost of the stacked articles are held in their position in the stack by the deformed clamping surfaces.

In order to seize a stack with the clamping jaws the stack must be held stable by stabilizing means such that at least the two edge surfaces or part-areas thereof to be seized are freely accessible. The stabilizing means to which the stack is turned over must comply to the same conditions.

Stacks of flat articles, which are held on two opposed edge surfaces or part-areas of edge surfaces by means of clamping jaws with elastically deformable clamping surfaces can easily be manipulated, i.e. they can be brought into various positions in space. The method and device according to the invention can be used for a large variety of flat articles without adaptation. Especially, articles with main surfaces not adhering sufficiently to each other, articles with main surfaces which are not exactly parallel and flat articles which are of small stiffness in the area of their edges, which articles are arranged in any amount to stacks, can be manipulated easily when clamped between clamping jaws which grip two opposite edge surfaces of the stack, whereby the stacking need not be of high precision.

With the advantages described above the method according to the invention is especially suitable for manipulating various flat articles such as articles inserted into newspapers and magazines for advertising purposes. These can e.g. be smaller and larger cards of little stiffness, super-finished sample bags with solid or liquid contents or bags containing flat articles which are smaller than the bag itself, wherein, due to the necessary frequent changes, it is very important that all these articles can be manipulated with the same method and the same device.

The device according to the invention substantially comprises one pair of clamping jaws with elastically deformable clamping surfaces which jaws can be pressed together by means of a clamping mechanism which is suitable for or easily adaptable to different formats of articles.

BRIEF DESCRIPTION OF THE DRAWINGS

The method according to the invention and exemplified embodiments of the device according to the invention are described in detail in connection with the following Figures, wherein.

DETAILED DESCRIPTION OF THE INVENTION

Figure 1:
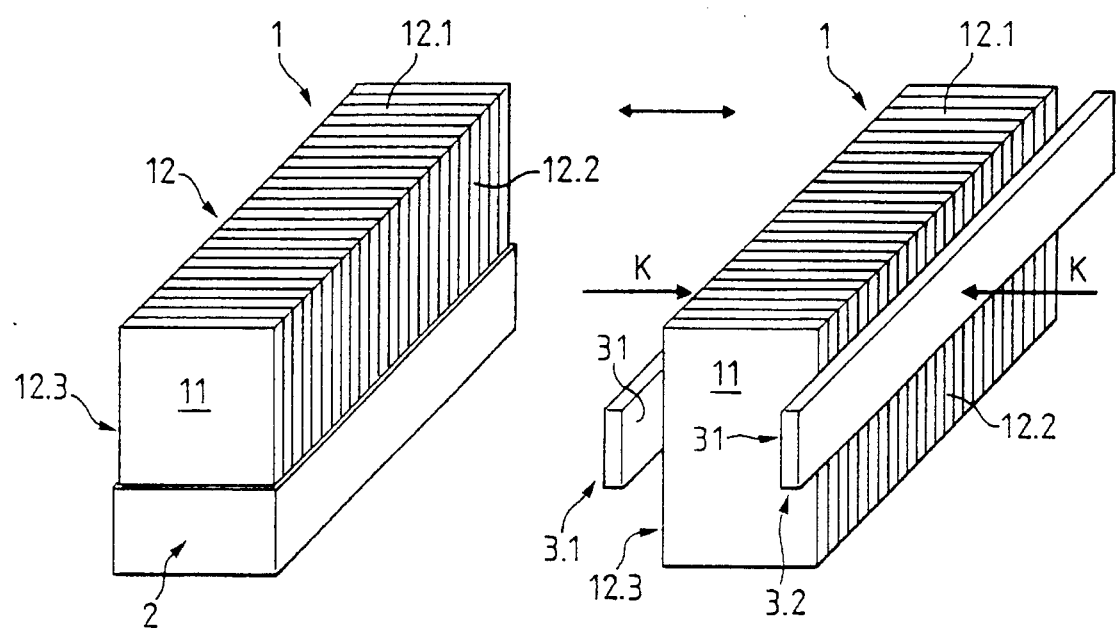
FIG. 1 shows the method steps according to the invention in a schematic three-dimensional drawing.

FIG. 1 shows on the left hand side the seizure/deposition state of a stack 1 with faces 11 and edge surfaces 12 which stack 1 is held in this state by stabilizing means 2, e.g. by an open container (box). The stabilizing means 2 provide free access to the top edge surface 12.1 and to the upper areas of the lateral edge surfaces 12.2 and 12.3. The seizure/deposition state as illustrated is a position with vertical faces of stack 1. Obviously other positions of the stack are possible, providing that the stacked articles can be held in a stacked order in these positions, in particular: seizing and depositing positions of the stack can differ from each other.

On the right hand side of FIG. 1 the same stack 1 is shown in a manipulation state, i.e. held by two clamping jaws 3.1 and 3.2, whereby the clamping jaws seize two opposite part-areas of the lateral edge surfaces 12.2 and 12.3 of the stack. The clamping surfaces 31 of the clamping jaws 3.1 and 3.2 are elastically deformable such that the edges of the stacked articles are slightly impressed into these surfaces when a clamping force K is applied to the clamping jaws. Stack 1 is again shown with vertical faces 11, whereby obviously especially for the manipulation state any position in space is possible for the stack.

The clamping jaws 3.1 and 3.2 shown in FIG. 1 are positioned on part-areas of the stack to be manipulated. The position of such part-areas on two opposite edge surfaces can be freely selected. Obviously it is also possible to use clamping jaws which cover two whole opposite edge surfaces, whereby in the seizure/deposition state it is only possible to stabilize the stack in the area of one edge surface and of the two faces.

The method according to the invention consists substantially of the following steps: two clamping jaws with elastically deformable clamping surfaces are positioned against two opposite edge surfaces or two opposite part areas of such edge surfaces of a stack which is held by a first stabilizing means such that the two opposite edge surfaces or the two opposite part areas of of the stick are freely accessible for the clamping jaws and such that the clamping surfaces protrude beyond the faces of the stack. The clamping jaws are then pressed together and the stack between the clamping jaws is removed from the first stabilizing means to be transported to a second stabilizing means. There the clamping jaws are moved away from each other and the stack is deposited.

Figure 2:
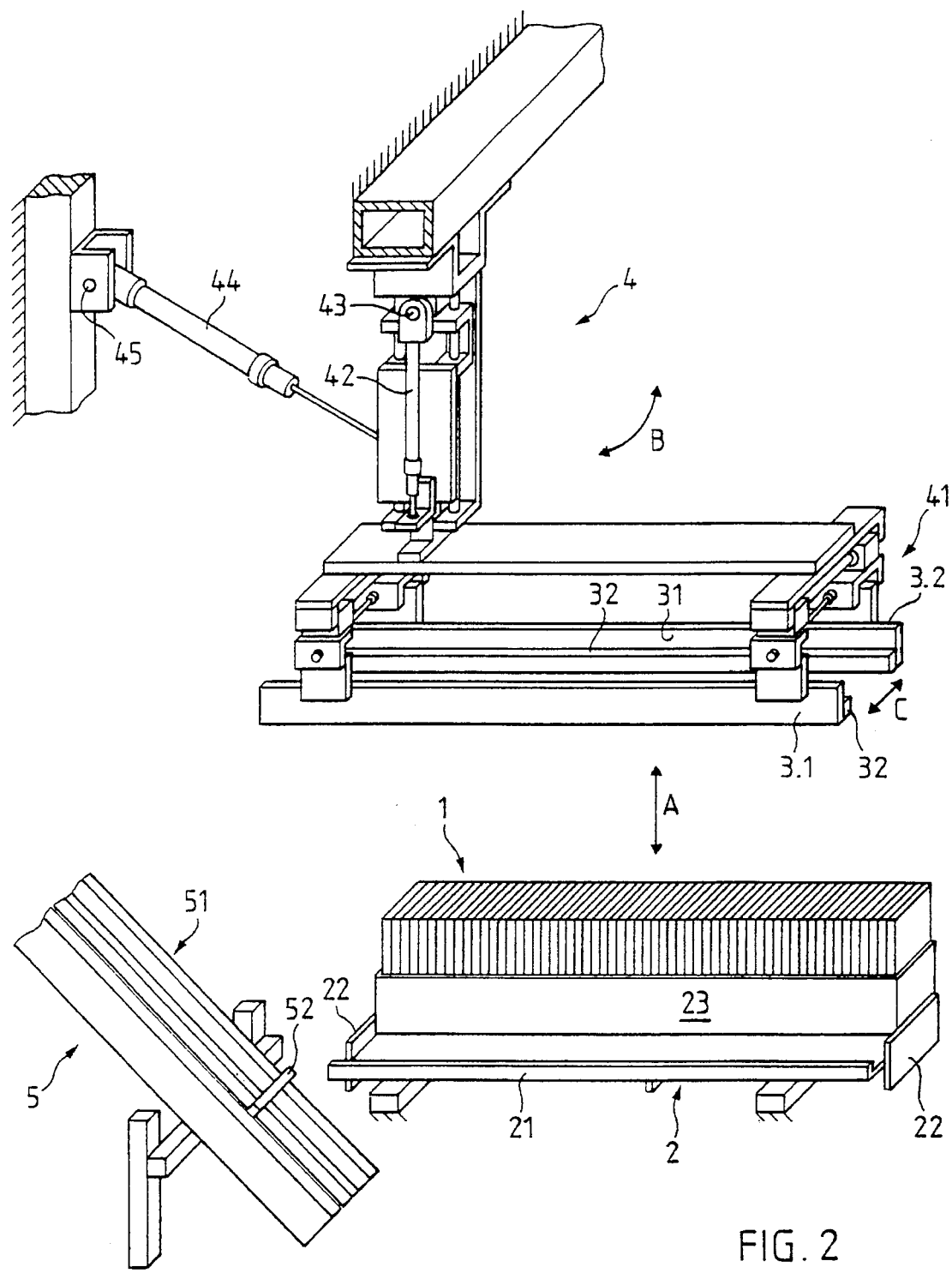
FIG. 2 shows an exemplified embodiment of the device according to the invention, again as a three-dimensional drawing, whereby the stabilizing means from which the stack is taken over and to which it is turned over are shown also.

FIG. 2 shows, in more detail, an exemplified embodiment of the device for carrying out the method according to the invention. The Figure shows stack 1 in a seizure state with first stabilizing means 2, a device 4 for carrying out the method according to the invention with clamping jaws 3.1 and 3.2 and second stabilizing means 5. The double arrows A, B and C schematically show the movements of the clamping jaws in order to seize stack 1 in the area of the first stabilizing means 2, to transport the stack into the area of the second stabilizing means 5 and to deposit it there. These are movements of the pair of clamping jaws (arrows A and B) and clamping movements of the clamping jaws relative to each other (arrow C).

The device 4 according to the invention thus comprises the two clamping jaws 3.1 and 3.2 to whose opposite surfaces (clamping surfaces 31) a strip 32 of elastically deformable material is applied which strip runs over the whole height that is, the whole longitudinal extent or distance between stack faces of a stack to be manipulated. The Figure shows a strip 32 which in a direction perpendicular to the height of the stack does not cover the clamping surfaces 31 completely which again is not obligatory. The strip can be as wide as or wider than the clamping surfaces 31. Instead of an applied strip 32 of an elastically deformable material, a corresponding coating of the clamping surfaces 31 may be used, or the clamping jaws may consist of a material that is stiff in itself but has a surface which is sufficiently elastically deformable.

The material used for strip 32 can e.g. be a closed-cell polyurethane foam. A tube filled with air is a further possibility.

The clamping jaws 3.1 and 3.2 can be pressed together by means of a clamping mechanism 41. An exemplified embodiment of such a clamping mechanism, which can be used for different formats of articles to be manipulated, is described in connection with FIG. 3. Furthermore the device 4 comprises means for carrying out an up-down-movement (arrow A), e.g. in the form of a hydraulic cylinder 42. The whole device 4 is turnable around a stationary swiveling axis 43 and comprises means for being turned around this axis, e.g. a hydraulic cylinder 44 which is turnable around a further stationary swiveling axis 45 and is hinged to the device.

The means for moving device 4 are not relevant to the invention. Obviously they must be specifically designed for each embodiment of the method according to the invention in order to be adapted to the first and second stabilizing means and to their relative position.

The first stabilizing means 2 shown in FIG. 2 for stabilizing the seizure state, consists of a container 23 open on its top, e.g. a box, which is held on a base 21, e.g. by clamping means 22.

The second stabilizing means 5 shown in FIG. 2 for stabilizing the deposition state, consists of an inclined channel 51 which is open on its top and in which a face-plate 52 is arranged advantageously such that it is adjustable or moveable. The stack is advantageously deposited, with the help of the clamping jaws, slightly above the face-plate 52 against which plate the stack then leans by force of gravity. From a stack, which is arranged in channel 51 such that its face leans against face-plate 52, the topmost article of the stack can be removed, e.g. by means of a corresponding serializing device, by shifting the face-plate 51 upwards in channel 52. For continuous operation at least two face-plates are required such that a second stack can be deposited below the first before the first stack.

Figure 3:
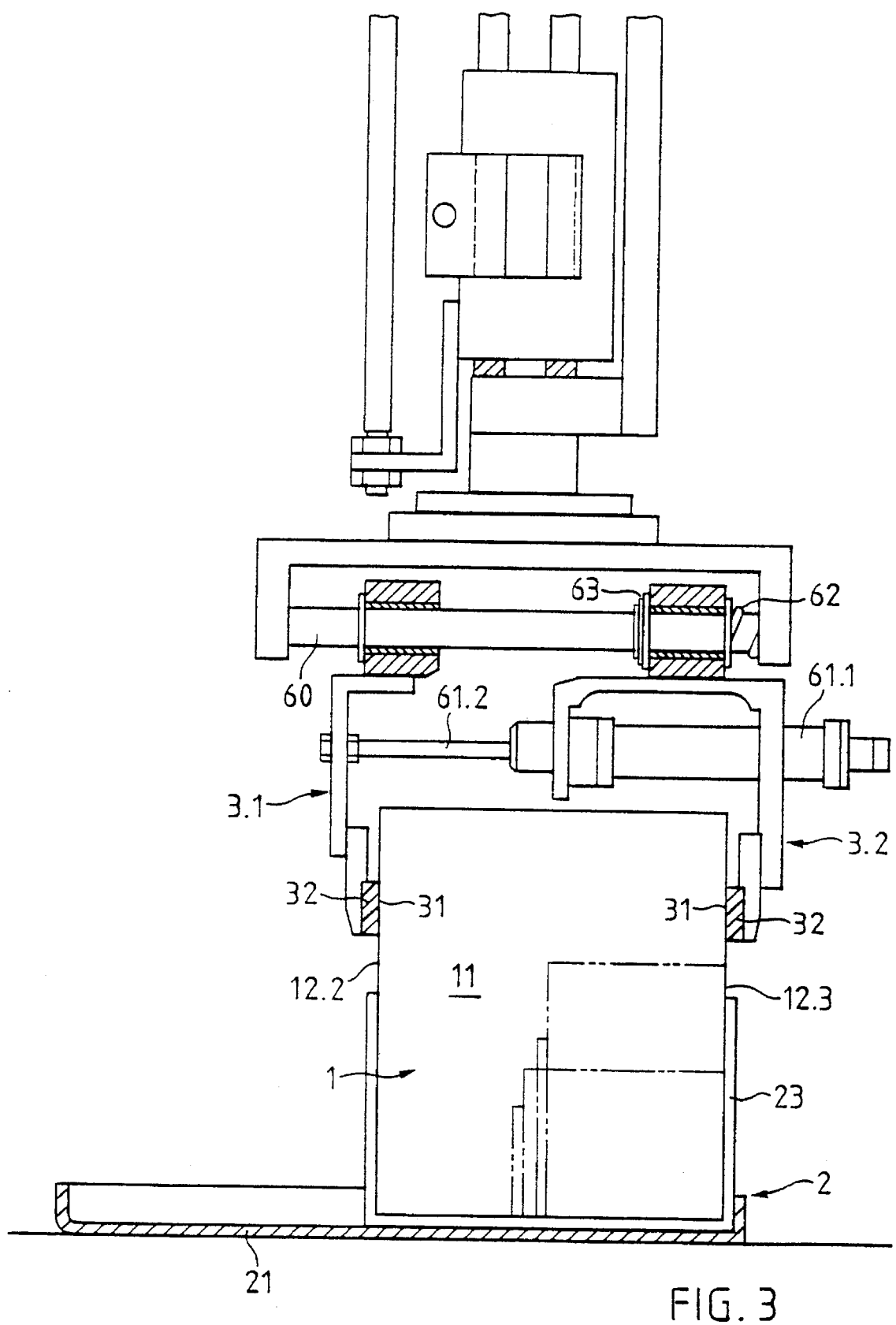
FIG. 3 shows a section of the embodiment according to FIG. 2, in section parallel to the faces of a stack to be manipulated.

FIG. 3 shows an exemplified mechanism for the clamping movement of clamping jaws 3.1 and 3.2 which mechanism is applicable to different formats of articles to be handled. The two clamping jaws 3.1 and 3.2 are arranged to be movable against each other and away from each other in the plain of the paper. They are connected through a cylinder 61.1 in which a double-acting piston (not shown) with a piston rod 61.2 is movably arranged, and they are guided on an axis 60 between two limit stops. Additionally the arrangement of the clamping jaws and the cylinder is pressed by a spring 62 against a reference stop 63 fixed rigidly to axis 60.

In an open position the clamping jaws 3.1 and 3.2 are held apart by the piston/cylinder (61.1/61.2) arrangement such that each jaw is in its outmost position on axis 60 counteracting the force of spring 62. For seizing a stack the distance between the clamping jaws is reduced by pressurization of the piston such that the clamping surfaces are pressed onto the edge surfaces 12.2 and 12.3 of stack 1 to be manipulated. At the same time the arrangement of clamping jaws and cylinder is pressed against limit stop 63 by spring 62. By these means the clamping position of clamping jaw 3.2 (reference jaw) is kept constant for every format and can be used as reference for further devices and part-devices, e.g. first stabilizing means 2.

The maximal width of the articles to be processed corresponds to the distance between the clamping jaws 3.1 and 3.2 when the reference jaw 3.2 presses against limit stop 63 and the other jaw 3.1 is in its outermost position on axis 60, whereby the deformation of the clamping surfaces and possibly of the articles must be taken into account. All smaller formats (shown by broken and unbroken lines) can also be processed with this device.

For manipulation of the advertising articles mentioned above, i.e. for their introduction into magazines and newspapers, it is suitable to use a device with which a clamping force of ca. 0.1 to 0.3 kp/cm² can be achieved.

I claim:

1. A method for manipulating a plurality of substantially similar flat articles each having two main surfaces and at least one pair of opposite edge portions delimiting the main surfaces, the flat articles being arranged in a stack such that consecutive ones of their main surfaces contact one another, outermost ones of the flat articles thereby forming two faces of the stack and consecutive superimposed edge portions of the flat articles thereby forming opposite edge surfaces of the stack, the method comprising the steps of:

providing a first stabilizing means and a second stabilizing means, each of the stabilizing means being effective for stabilizing the stack in a freely selectable spatial orientation whereby at least two opposite portions of the opposite edge surfaces extending from one face of the stack to another face of the stack are accessible when the stack is being stabilized in either of the stabilizing means;

providing a clamping mechanism including a pair of clamping jaws having substantially flat and elastically deformable clamping surfaces facing each other and having a length greater than a distance between the two faces of the stack;

positioning the clamping surfaces parallel to the at least two opposite portions of the opposite edge surfaces of the stack when the stack is being stabilized by the first stabilizing means;

moving the clamping jaws toward each other into contact with the at least two opposite portions of the opposite edge surfaces of the stack after the step of positioning thereby clamping the stack between the clamping jaws whereby the clamping surfaces are deformed;

moving the clamping jaws together with the stack to the second stabilizing means; and releasing the stack by moving the clamping jaws away from each other.

2. The method according to claim 1, wherein:

the flat articles are at least one of cards, super-finished sample bags having one of solid and liquid contents, paper sample bags, and plastic sheet sample bags having any content; and the step of providing the first stabilizing means further includes providing the first stabilizing means with an open container from which the flat articles protrude.

3. The method according to claim 1, wherein the steps of moving the clamping jaws toward each other and moving the clamping jaws away from each other include the step of applying a clamping force to the clamping jaws in a range between 0.1 and 0.3 kp/cm².

4. A device for manipulating a plurality of substantially similar flat articles, each article having two main surfaces and at least one pair of opposite edge portions delimiting the main surfaces, the flat articles being arranged in a stack such that consecutive ones of their main surfaces contact one another, outermost ones of the flat articles thereby forming two faces of the stack and consecutive superimposed edge portions of the flat articles thereby forming opposite edge surfaces of the stack, the device comprising:

a first stabilizing means and a second stabilizing means, each of the stabilizing means being effective for stabilizing the stack in any spatial orientation including an inclined orientation, a vertical orientation, and a horizontal orientation, whereby at least two opposite portions of the opposite edge surfaces extending from one face of the stack to another face of the stack are accessible when the stack is being stabilized in either of the stabilizing means; and a clamping mechanism disposed adjacent the first stabilizing means and the second stabilizing means and including:

two clamping jaws having substantially flat and elastically deformable clamping surfaces facing each other and having a length greater than a distance between the two faces of the stack;

means operatively connected to the two clamping jaws for pressing together the two clamping jaws for clamping the stack between the clamping jaws at the at least two opposite portions of the opposite edge surfaces of the stack; and means operatively connected to the two clamping jaws for moving the stack between the first stabilizing means and the second stabilizing means.

5. The device according to claim 4, wherein the elastically deformable clamping surfaces comprise continuous strips of an elastically deformable material fixed onto the clamping jaws in a direction of the distance between the two faces of the stack.

6. The device according to claim 5, wherein the continuous strips are made of a closed-cell polyurethane foam.

7. The device according to claim 5, wherein the continuous strips are made of an air filled tube.

8. The device according to claim 4, further comprising:

a piston-cylinder arrangement connecting the clamping jaws together; and an axis element including two limit stops thereon, the piston-cylinder arrangement being operatively connected to the axis element such that the piston cylinder arrangement is guided between the two limit stops for moving the clamping jaws relative to one another.

9. The device according to claim 8, wherein one of the two limit stops includes a reference limit stop, the device further including a spring disposed on the axis element and being effective for exerting a force on the piston-cylinder arrangement for pressing the clamping jaws against the reference limit stop.

10. The device according to claim 4, wherein the first stabilizing means comprises an open container having a base and being configured such that a stack positioned within the container protrudes therefrom.

11. The device according to claim 4, wherein the second stabilizing means comprises:

an inclined channel which is open on a top side thereof; and a face-plate disposed so as to be displaceable within the channel.

12. The device according to claim 4, wherein the clamping jaws are adapted to be swivelable together about a swiveling axis.

* * * * *